May 17, 1966  R. TOUVAY  3,251,667
SHAPING GLASS SHEET ON MOLTEN METAL BATH
Filed July 22, 1963

INVENTOR.
ROBERT TOUVAY
BY *Bauer + Seymour*
ATTORNEYS

United States Patent Office 3,251,667
Patented May 17, 1966

3,251,667
SHAPING GLASS SHEET ON MOLTEN
METAL BATH
Robert Touvay, Paris, France, assignor to Compagnie de
Saint-Gobain, Neuilly-sur-Seine, France
Filed July 22, 1963, Ser. No. 296,682
Claims priority, application France, Apr. 7, 1959,
791,377, Patent 1,231,129
3 Claims. (Cl. 65—32)

This case is a continuation-in-part of application Serial No. 18,291, filed March 29, 1960, now abandoned partaking of the priority of April 7, 1959 claimed in that case.

This invention relates to the manufacture of glass, particularly to the making of sheet glass, fire polished glass, and thin glass sheet.

It has long since been proposed to make flat glass having the appearance of polished glass by pouring molten glass on the surface of a bath of molten metal, allowing the glass to spread out freely while floating on the metal. The continuous production of glass sheet which hardens while it progresses across a molten metal bath, from which it passes through a standard annealing leer, was described in 1902. It has recently been proposed in French Patent 1,171,875 to prepare sheet glass with a plane surface of polished aspect by depositing the ribbon of glass on a continuous support moving in a chamber maintained at a convenient temperature.

It is an object of the invention to improve the process of manufacturing glass sheets by rolling. A further object is to improve the above-mentioned processes of producing sheet glass having a polished aspect and plane surface.

It has heretofore been deemed difficult to make wide sheets of glass, requiring laminating rollers of large diameters, having less than 4 mm. thickness by passing molten glass between metallic rollers to form the sheet, because the rollers produce by their contact with the glass a congealing that goes to the core of the sheet and this does not effect a satisfactory rolling.

Another object of the invention is to produce sheet glass of plane surface and polished aspect, and of thickness less than 4 mm., without grinding or polishing. Another object is to produce a system using improved rollers. Other objects will become apparent as the description proceeds.

According to a characteristic of the present invention, the glass is formed into a sheet by rolling at high temperature and the rolled plastic glass sheet is deposited on a continuous plane support. In the preferred form of the invention the sheet is formed between rollers at a temperature above that at which the glass adheres to the usual metallic rollers. The glass sheet is preferably shaped from molten glass at working temperature, which is about 1,100° to 1,130° C. for the usual soda lime glass compositions, in a space which is at a temperature not far from the temperature of the receiving support. The support upon which the plastic glass sheet is deposited may be, for example, a support provided with an air- or gas-cushion between the support and the glass, or a bath of molten metal across the surface of which the glass is drawn.

The temperature of the glass sheet should be high enough, as it is deposited on the support, to permit its surface to level off rapidly, because of its fluidity. Consequently, the supporting apparatus may be as short as possible. The fluidity necessary to prompt levelling and reasonably short apparatus is obtained, using ordinary glasses, when the temperature of the laminating rollers at the moment when they leave the contact with the glass sheet is superior to 650° C. The temperature of the outer layers of glass in the sheet is immediately thereafter slightly superior to that of the rollers and rises rapidly by transmission of calories from the core of the sheet, which is hotter, not having been equally cooled by contact with the rollers. The temperature reached after equalization between the outer layers and the core, may for example with ordinary glass, be between about 820° to 850° C. In the preferred form of the invention this temperature is not allowed to reach 850° C. because gravity and surface tension cause changes in the width and thickness of the sheet of glass at and above that temperature.

The plane support upon which the glass sheet rests after discharge from the rollers is preferably a bath of molten metal, for instance tin. Tin has a melting point of 231.9° C. and a boiling point of 2,270° C. so that its temperature can be regulated between wide limits. In this invention the tin is maintained at a temperature of about 800° C.–850° C. in that portion of the bath which receives the glass sheet and the sheet thus receives directly a fire polish without need for later grinding and polishing. Rolled sheets of glass present defects of surface of minute depth and slight width which are self-leveling at 800° to 850° C. in a reasonable time of 10 to 2 minutes, so that a sheet in that temperature range will acquire a fire polish in several minutes. By keeping the rolled sheet at that temperature, on the surface of a metal bath, until it has obliterated its defects, it is possible to roll the sheet initially to its final dimensions of width and thickness, which need not be the stabilized width and thickness of 6.5 mm. but may be less than 4 mm., previously impossible, or materially thicker than the thickness provided by gravity and surface tension. In short, self-stabilization to a naturally-occurring dimension need no longer be practiced. In the preferred form of the invention the tin bath has a series of decreasing temperatures, for instance from 1100° C. until approximately 650°–550° C. has been reached, so that after the fire polishing the tin progressively reduces the temperature of the glass. The temperature of the glass should be reduced to about the above-mentioned temperature so that when it leaves the surface of the tin it is sufficiently cooled and solidified to be readily handled by the usual handling machinery.

In the preferred form of the invention the glass at working temperature, about 1100°–1130° C. for usual glass, is rolled between carbon surfaced rollers, for instance graphite rollers or metallic rollers provided with a constantly renewed carbon coating. It is a part of this invention that these rollers be used to form the glass sheet at high temperature. The glass does not stick to these rollers whereas the formation of glass at high temperature, by metal rollers, is accompanied by attachment of the glass to the rollers, which destroys the useful continuity of the sheet. The carbon rollers are, of course, combustible and this invention provides a nonoxidizing atmosphere by which they are surrounded. For example, the following gases are among those useful in providing a nonoxidizing atmosphere; nitrogen, $CO_2$. As illustrated in FIG. 2, the sheet of glass maintains substantially the width with which it issued from between the rollers during its passage along the molten metal bath, and as illustrated in FIG. 1 the sheet maintains substantially the same thickness with which it issued from between the rollers except for the leveling and fire polishing of its surfaces.

I have also shown that there is an additional advantage which, quite unexpectedly, arises from the use of carbon rollers. With metal rollers it is substantially impossible to produce wide glass sheets less than 4 mm. in thickness because they produce a congealing of the contacting glass which is transmitted to the core of the sheet. It is possible, according to my discovery, to give to the rollers of graphite a spacing which may be noticeably lower than 4 mm. so that they will produce satisfactory sheets of glass less than 4 mm. in thickness, which have flat surfaces of fire polished aspect. This is particularly valuable because the preparation of such thin sheets even by grinding and polishing of thicker sheets to the desired thickness, is accomplished by serious risk of breakage.

In order to avoid the shrinkage of the edges of the rolled plastic thin sheet of glass, under the action of surface tension, for instance when the temperature is allowed to approach 850° C. and the glass has become less stiff and more subject to such forces, means can be provided to maintain the edges on the continuous plane support on which the plastic sheet is deposited. Such means may be those used in the manufacture of drawn glass sheets.

To prevent oxidation and combustion of the carbon rollers, an enclosure is provided for the rollers and the bath which is filled with a reducing or neutral gas. This prevents the oxidation or burning of the rollers and the oxidation of the surface of the metal bath. There is described hereafter a novel apparatus adapted to carry out the novel process.

In the preferred process the glass is rolled hotter than it can be rolled with metal rollers, does not suffer the defects which would be imparted by metal rollers at such high temperatures, is delivered to the receiving bath at about the temperature of the fire polishing end of the receiving bath so that it does not suffer thermal contraction or expansion, is delivered by rollers which have a temperature when they leave the glass of at least 650° C., is not cooled between rolling and depositing to a temperature below the temperature of the receiving bath, need not be reheated by the bath or by heating means, accomplishes leveling and fire polishing by surface absorption of its own internal heat, and is cooled by progressive contact with cooler regions of the bath, all in a nonoxidizing atmosphere and a confined space the temperature of which is established by its internal heat sources, the molten glass, rolled glass, cooled glass, rollers, and inflow of inert gas.

The above and further objects and novel features of the present invention will more fully appear from the following detailed description when the same is read in connection with the accompanying drawing. It is to be expressly understood, however, that the drawing is for the purpose of illustration only and is not intended as a definition of the limits of the invention, reference for this latter purpose being had primarily to the appended claims.

In the drawing, wherein like reference characters refer to like parts throughout the several views.

Figure 1:
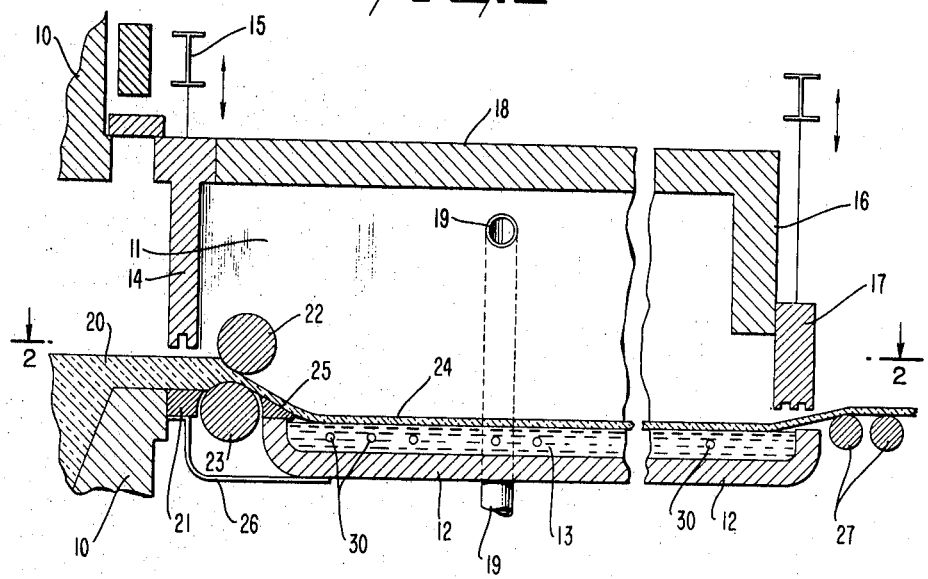
FIG. 1 is a longitudinal section of an apparatus according to the preferred form of the invention.
Figure 2:
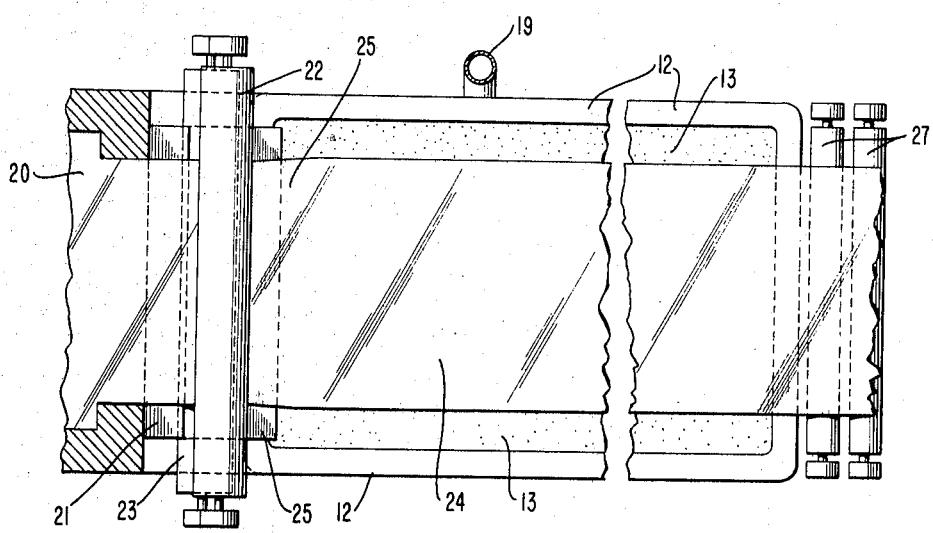
FIG. 2 is a plan view corresponding to FIG. 1.

Referring to the numerals of the drawing a furnace 10 is connected to an enclosure 11 having a bottom 12 constituting a wall for a molten metal bath 13, an end wall 14 which is adjustable in height by means 15 which is shown only diagrammatically; an end wall 16 at the discharge end which has a gate 17 which is vertically adjustable, and a top 18. A conduit 19 delivers nonoxidizing gas, usually nitrogen because of its availability and low cost, to the interior of the enclosure under sufficient pressure to exclude air therefrom.

The glass 20 is delivered across a pillow block 21 to rollers 22, 23, the surfaces of which are maintained at a temperature such that at the moment when they leave the contact of the glass sheet, they are above 650° C. These rollers may be internally cooled by ordinary cooling not constituting a part of this invention. Pillow blocks 21, 25 are preferably made of graphite with perfectly smooth faces upon which the glass rests. A metal closure 26 seals the bottom of the chamber 11 between the wall 12 and the end of furnace 10. This closure is readily removable to provide access to the rollers. The gates 14, 17, can be brought as close as desired to the glass which is beneath them, furnishing only a very small aperture for the escape of inert gases. The refractory gate 14 can be lowered to penetrate into the glass so as to form a separation between chamber 11 and the furnace. At the discharge end of the furnace the glass sheet is transported upon rollers 27.

The glass from the working zone of the furnace is admitted to the chamber 11 through the aperture provided by the bottom of gate 14 and the top of pillow block 21. It is received by rollers 22, 23, which are driven at speeds customary in the prior art and delivers the formed sheet to pillow block 25 from which it is deposited on the molten tin bath 13, at a temperature about 800° C.–850° C., for example, for usual glasses. The temperature of the glass before the rollers is in the neighborhood of 1,100° C.–1,150° C. for ordinary glass. The tin bath at the place where it receives the glass which is upstream with respect to the flow of the glass, is maintained at a temperature about 800° C. and the temperature of the bath is decreased from that portion towards the end where it is about 600° C. This enables the glass to be delivered at an adequate temperature for its further treatment, which is to say that the glass is sufficiently rigid to be readily handled and sufficiently hardened, at least on the surface, so that it is not marred by handling means.

The tin bath is maintained at different temperatures along its length. This result may be carried out by resistors 30 disposed in the portions to be heated in such numbers or intensity as to achieve in each selected zone the temperature desired, and by cooling means, such as tubes cooled by a gaseous current passing through them, in the zones where an excess of calories brought by the glass is to be removed. This has been diagrammatically indicated in the drawing by reduced numbers of resistors and tubes.

According to a particular example of carrying out the invention, the treated glass has the following composition by weight:

| | |
|---|---|
| $SiO_2$ | 72.4 |
| $Al_2O_3$ | 1.20 |
| $Na_2O$ | 14.16 |
| $K_2O$ | 0.01 |
| CaO | 8.10 |
| MgO | 3.80 |
| $Fe_2O_3$ | 0.13 |
| $SO_3$ | 0.30 |

A quantity of 1120 kg. of such a glass is obtained from 1373 kg. of batch of vitrifiable materials containing:

| | Kg. |
|---|---|
| Sand | 819.06 |
| Soda carbonate | 235.68 |
| Soda sulfate | 49.38 |
| Limestone | 43.77 |
| Dolomite | 204.89 |
| Hydrated alumina | 15.85 |
| Carbon | 3.22 |
| Iron oxide | 1.22 |

This glass can be rolled between carbon surfaced rollers at a high temperature such that the temperature of the surface of the rollers when they leave the contact with the glass is about 680° C. for the upper roller and about 660° C. for the lower roller. The rolling speed may be about 3.50 meters per minute.

The part of the tin bath receiving the glass sheet thus obtained is maintained at a temperature of about 840° C. along a length of about 20 meters, so that the sheet will remain at that temperature for about 6 minutes. Then the temperature of the tin bath will be decreased from about 840° C. to 650° C. along a length of about 10 meters.

The advantages of the invention are many, it produces thinner sheets of good quality than could previously be produced with a plane surface and fire polished aspect; the use of carbon rollers and a system of making their use possible, combine to secure more perfect surfacing and more accurate thickness in the sheet; the reduction in temperature is carried out by the use of a molten tin bath of temperatures decreasing along its length. The chamber in which the forming of the sheet and its cooling to handling temperature are carried out, is supplied with inert gas and with adjustable gates which cooperate with the gas supply to exclude the exterior atmosphere; the new system permits the formation of sheets at higher temperature than was previously possible, by eliminating the attachment of the glass to the roller surface at high temperature; the new thin sheets of thickness less than 4 mm. are clear and transparent, of fire polished aspect, and lack the imperfections which were characteristic of such thin sheets when produced by metallic rollers under conditions of the prior art.

Important characteristics of the invention are that the glass sheet is formed at high temperatures and deposited on a plane support at a temperature which permits immediate subsidence with the formation of a fire polished aspect. The preferred method of handling the formed sheet is on a molten metal bath. Combustible rollers, preferably of graphite, are employed with the exclusion of oxidizing gases. The presence of the neutral or reducing atmosphere protects the graphite rollers and the metal bath from oxidization. The pillow block is graphite.

Advantages of the invention compared to the comparable systems of the prior art are that the temperature necessary to fire polishing is reduced, that the flatness of the resulting sheet is better than that of the prior art, that hammering is eliminated partly due to the fact that he difference in temperature between the surface of the rollers and the glass upstream of the rollers is reduced compared to the prior art, and that leveling and eliminating of surface defects occurs readily under the conditions of this invention at 800°–850° C. in less than 10 minutes.

A particular advantage is that the glass is not dependent on gravity and tension for its thickness and width but can be cast to other final thicknesses and widths, even to ones which are thinner than possible by prior art methods.

This process is applicable to casting glass on other supports than fluids, for example upon air cushions, and upon moving surfaces of solids, for instance on moving belts covered with chamotte, although in the latter case only the upper face will be fire polished and leveled.

In applying the invention to glasses other than soda lime or typical window glass, which has borne the burden of the preceding description, for instance to glass compositions containing $Al_2O_3$ or $B_2O_3$ which have their best surface leveling qualities approaching 880° C., one is well advised to change the rolling temperature to one which is characteristic of the working temperature of the particular glass, and to adjust the take-off temperature of the roller to above or below 650° C. as required to permit the internal heat of the glass to level the surface defects on the hot part of the metal bath. The temperature of the hot part of the metal bath may also be adjusted to a temperature approximately the same as that of the glass sheet as it is deposited. In this case also the general temperature of the glass is not allowed to fall below the temperature of the enclosure in which the rolling takes place or so far below the temperature of the receiving end of the bath that a reheating is required to level it. Neither is its general temperature allowed to reach the degree of dimensional change.

As many apparently widely different embodiments of the present invention may be made without departing from the spirit and scope thereof, it is to be understood that the invention is not limited to the specific embodiments.

What is claimed is:
1. A method of shaping sheet glass initially to its final dimensions with a fire polished aspect which comprises, shaping the sheet between carbon surfaced rollers from a mass of relatively fluid glass at a temperature equivalent to about 1,100°–1,150° C. for ordinary glass, the rolling of the sheet glass being carried out at a temperature sufficiently high so that the temperature of the rollers at the place where they leave the glass is above 650° C., depositing the sheet on a molten metal bath having a temperature at the place of deposit about 800° C.–850° C., and maintaining it on a metal bath of such temperature until its surfaces are substantially defect free and are fire polished, cooling the sheet by moving into contact with zones of molten metal of decreasing temperature until it can be handled without marring by ordinary handling means, maintaining a nonoxidizing atmosphere about the rollers and the metal bath, and withdrawing the sheet from the nonoxidizing atmosphere and from contact with the metal bath.

2. A method of shaping ordinary thin glass sheet having a thickness less than about 4 mm. with a fire polished aspect which comprises shaping the sheet between carbon surfaced rollers from a mass of relatively fluid glass at a temperature equivalent to about 1,100°–1,150° C. for ordinary glass, the rolling of the glass sheet being carried out at a temperature sufficiently high so that the temperature of the rollers at the place where they leave the glass is above 650° C., depositing the sheet on a molten metal bath having a temperature at the place of deposit circa 800° C.–850° C. and maintaining it on metal at such temperature until its surfaces are substantially defect free and are fire polished, cooling the sheet by moving it into contact with zones of molten metal decreasing temperature until it can be handled without marring by ordinary handling means, maintaining a nonoxidizing atmosphere about the rollers and the metal bath, subjecting the edges of the sheet to forces opposing contraction, and withdrawing the sheet from the nonoxidizing atmosphere and from contact with the metal bath.

3. A method of shaping sheet glass initially to its final dimensions with a fire polished aspect which comprises shaping the sheet between carbon surfaced shaping means from a mass of relatively fluid glass at a temperature equivalent to about 1,100–1,500° C. for ordinary glass, the shaping of the sheet glass being carried out at a temperature sufficiently high so that the temperature of the shaping means at the place where it leaves the glass is above 650° C., depositing the sheet on a molten metal bath having a temperature at the place of deposit about 800–850° C., and maintaining it on a metal bath of such temperature until its surfaces are substantially defect free and are fire polished, cooling the sheet by moving it into contact with zones of molten metal of decreasing temperatures until it can be handled without marring by ordinary handling means, maintaining a nonoxidizing atmosphere about the shaping means and the metal bath, and withdrawing the sheet from the nonoxidizing atmosphere and from contact with the metal bath.

References Cited by the Examiner
UNITED STATES PATENTS

| | | | |
|---|---|---|---|
| 789,911 | 5/1905 | Hitchcock | 65—182 |
| 1,469,383 | 10/1923 | Crowley | 65—90 |
| 1,564,240 | 12/1925 | Hitchcock | 65—182 XR |
| 2,387,886 | 10/1945 | Devol | 65—25 |
| 2,478,090 | 8/1949 | Devol | 65—25 |
| 2,505,103 | 4/1950 | Devol | 65—25 |
| 2,911,759 | 11/1959 | Pilkington et al. | 65—32 XR |
| 2,992,517 | 8/1961 | Hicks | 65—3 |
| 3,083,551 | 4/1963 | Pilkington | 65—65 XR |

DONALL H. SYLVESTER, *Primary Examiner.*